(12) United States Patent
Felton et al.

(10) Patent No.: US 7,664,756 B1
(45) Date of Patent: Feb. 16, 2010

(54) CONFIGURATION MANAGEMENT DATABASE IMPLEMENTATION WITH END-TO-END CROSS-CHECKING SYSTEM AND METHOD

(75) Inventors: John D. Felton, Leawood, KS (US); Scott D. Perrea, Overland Park, KS (US); Michael J. Taylor, Liberty, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 345 days.

(21) Appl. No.: 11/245,593

(22) Filed: Oct. 7, 2005

(51) Int. Cl.
*G06F 17/30* (2006.01)
*H04L 12/28* (2006.01)
*G06F 15/177* (2006.01)

(52) U.S. Cl. .................... 707/10; 370/254; 715/735
(58) Field of Classification Search .................. 707/10, 707/100, 205; 370/254–258; 726/2; 705/28; 709/223; 717/120, 101; 715/716–726
See application file for complete search history.

(56) References Cited

U.S. PATENT DOCUMENTS

| | | | |
|---|---|---|---|
| 5,721,913 A | 2/1998 | Ackroff et al. | |
| 6,405,364 B1 | 6/2002 | Bowman-Amuah | |
| 6,601,234 B1 | 7/2003 | Bowman-Amuah | |
| 6,640,244 B1 * | 10/2003 | Bowman-Amuah | 709/207 |
| 6,671,818 B1 | 12/2003 | Mikurak | |
| 6,694,329 B2 | 2/2004 | Murray | |
| 6,865,565 B2 | 3/2005 | Rainsberger et al. | |
| 6,904,593 B1 | 6/2005 | Fong et al. | |
| 6,964,044 B1 | 11/2005 | Hudson et al. | |
| 7,100,195 B1 * | 8/2006 | Underwood | 726/2 |
| 2003/0055749 A1 * | 3/2003 | Carmody et al. | 705/28 |
| 2003/0212643 A1 * | 11/2003 | Steele et al. | 705/400 |
| 2004/0001099 A1 | 1/2004 | Reynar et al. | |
| 2005/0138074 A1 | 6/2005 | O'Connor et al. | |
| 2005/0256881 A1 | 11/2005 | Harrison et al. | |
| 2006/0059253 A1 * | 3/2006 | Goodman et al. | 709/223 |
| 2006/0123022 A1 | 6/2006 | Bird | |

OTHER PUBLICATIONS

Hemmat, Merzad, "Defining and Sizing Feasible Approaches to Business Needs Within an Integrated Development Process," filed May 5, 2003, U.S. Appl. No. 10/429,615, Specification (33 pgs.) and Drawings (3 sheets).

Hemmat, Merzad, "Method for Discovering Functional and System Requirements in an Integrated Development Process," filed Aug. 18, 2003, U.S. Appl. No. 10/643,334, Specification (29 pgs.) and Drawings (4 sheets).

(Continued)

*Primary Examiner*—Tim T. Vo
*Assistant Examiner*—Bao G Tran (57) ABSTRACT

A system for end-to-end configuration management is provided. The system includes, a server component, a network component, an application component, a resources component, and a services component each operable to identify servers, communication network hardware, applications, human resources, and services, respectively, of the enterprise. The system further includes a management component operable to identify an end-to-end relationship between at least some of the communication network hardware to at least some of the servers, and from at least some of the servers to at least some of the applications, and from at least some of the applications to at least some of the human resources, and from at least some of the applications to at least some of the services.

20 Claims, 6 Drawing Sheets

OTHER PUBLICATIONS

Felton, John D., "Application Management Database with Personnel Assignment and Automated Configuration," filed Aug. 2, 2005, U.S. Appl. No. 11/195,543, Specification (22 pgs.) and Drawings (3 sheets).

Office Action dated Dec. 10, 2007 (18 pages), U.S. Appl. 11/195,543, filed Aug. 2, 2005.

Advisory Action dated Aug. 26, 2008 (3 pages), U.S. Appl. No. 11/195,543, filed Aug. 2, 2005.

Notice of Panel Decision from Pre-appeal Brief Review (2 pages), U.S. Appl. No. 11/195,543, filed Aug. 2, 2005.

Office Action dated Jan. 7, 2009 (19 pages), U.S. Appl. No. 11/195,543, filed Aug. 2, 2005.

* cited by examiner

CONFIGURATION MANAGEMENT DATABASE IMPLEMENTATION WITH END-TO-END CROSS-CHECKING SYSTEM AND METHOD

CROSS-REFERENCE TO RELATED APPLICATIONS

This application has subject-matter related to U.S. patent application Ser. No. 11/195,543, entitled "Application Management Database With Personnel Assignment and Automated Configuration Application," by John D. Felton, Scott D. Perrea, and Michael J. Taylor, filed Aug. 2, 2005, and to U.S. patent application Ser. No. 10/429,615, filed May 5, 2003 and entitled "Defining and Sizing Feasible Approaches to Business Needs Within an Integrated Development Process", and to U.S. patent application Ser. No. 10/643,334, filed Aug. 18, 2003 and entitled "Method For Discovering Functional and System Requirements In An Integrated Development Process", all of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to a system and method for managing an enterprise, and more particularly, but not by way of limitation, to a method and system for end-to-end configuration management.

BACKGROUND OF THE INVENTION

The information age and the advent of the Internet have changed the way people connect, the way information is shared, and how people conduct business. Managing information technology assets and the business carried out amongst the assets has become an increasingly daunting task. Enterprise assets include computer-based entities such as general-purpose computers, servers, mobile devices, all of the systems of computer and telecommunication networks and their components (hardware and software), as well as the human resources and services related to these systems. Assets may contain vast numbers of applications and information files. Assets are constantly added and removed from a networked enterprise. Assets also change ownership and change physical locations. The managing of asset change and/or the configuration change of the assets presents unique challenges.

SUMMARY OF THE INVENTION

An embodiment of the present disclosure provides a method of end-to-end configuration management. The method comprises creating an inventory of servers of an enterprise, and creating an inventory of network components of the enterprise. The method also provides for creating a first inventory of applications of the enterprise using a first inventory component. The method also creates a second inventory of the applications of the enterprise using a second inventory component. The method also provides for cross-checking the first and second inventories of the applications of the enterprise to create a master inventory of applications of the enterprise, wherein the master inventory of the applications includes at least some information related to at least some of the servers whereon the applications reside. The method further provides for using the at least some information related to some of the servers from the master inventory to improve the inventory of the servers of the enterprise. The method includes determining people of the enterprise and for determining services of the enterprise. The method further provides for identifying an end-to-end relationship from at least some of the servers, to at least some of the network components, to at least some of the applications, to at least some of the people, and to at least some of the services of the enterprise.

In an embodiment, a system for end-to-end configuration management is provided. The system comprises a server component operable to identify servers in an enterprise. The system also comprises a network component operable to identify communication network hardware of the enterprise. The system also comprises an application component operable to identify applications of the enterprise. The system also comprises a resources component operable to identify human resources of the enterprise, and a services component operable to identify services of the enterprise. The system further comprises a management component operable to identify an end-to-end relationship between at least some of the communication network hardware to at least some of the servers, and from at least some of the servers to at least some of the applications, and from at least some of the applications to at least some of the human resources, and from at least some of the applications to at least some of the services.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

As used herein, the term data store may refer to various computer-based storage systems, and/or applications such as relational databases, directories, and other storage systems. As mentioned above, the managing of enterprise assets may be challenging. For example, often a user associated with an asset may change jobs or responsibilities. Tracking the user change often includes a significant amount of manual entry to change ownership. Assets include a plurality of associated entities that enable the asset to operate. Moreover, an asset may be stacked, that is the asset may depend on a second asset. Therefore, in some cases, it may be difficult to track a configuration change of the enterprise.

Accordingly, the embodiments discussed below contemplate an end-to-end configuration management system and method for improved identification, inventory, and management of enterprise assets, as well as the relationships between these assets. The end-to-end configuration management system and method provides a real-time holistic view of the enterprise, and allows for minimized disruption when making change to the enterprise by understating the enterprise systems and their relationships. The end-to-end configuration management system employs customized tools for identifying, cross-referencing and comparing inventories to provide for improved identification of the assets and their relationships to other enterprise assets. In some embodiments, the end-to-end configuration management system may be used in conjunction with a plurality of off-the-shelf software (COTS) tools, which operate with the customized tools to provide end-to-end configuration management of the enterprise.

Figure 1A:
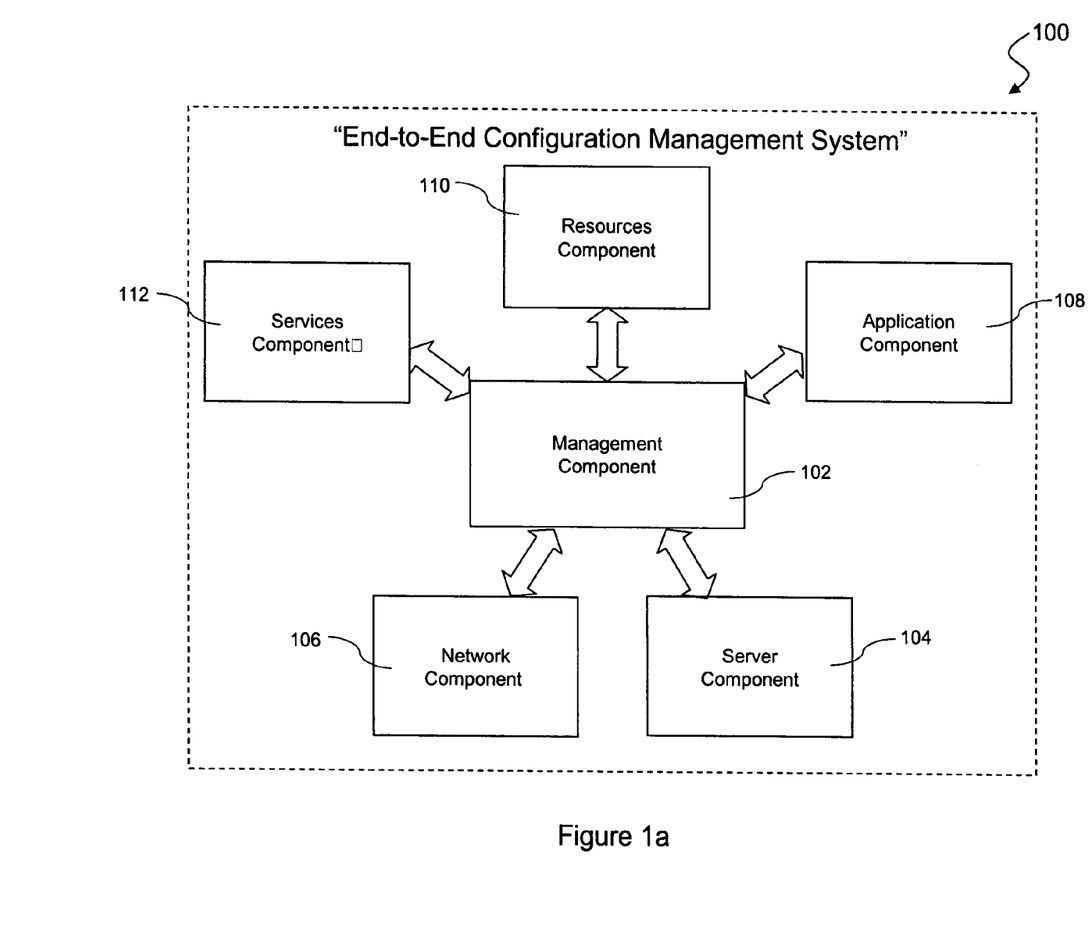
FIG. 1a is a block diagram of an embodiment of the present disclosure.

Turning now to FIG. 1a, a system 100 for end-to-end configuration management is depicted. The system 100 includes a management component 102 in communication with a server component 104, a network component 106, an application component 108, a resources component 110, and a services component 112. In an embodiment, the management component 102 may communicate with the server component 104, the network component 106, the application component 108, the resources component 110, and the services component 112 through an optional network (not shown).

The management component 102 operates to identify an end-to-end relationship between one or more enterprise assets. The management component 102 utilizes one or more of the component(s) 104, 106, 108, 110, and 112 to manage relationships between the enterprise assets. The term end-to-end or end-to-end relationships or configuration management, as used herein, may refer to identifying and maintaining relationships and/or associations between at least three or more of the communication network hardware systems and servers, applications residing on the servers, services provided by the applications, and the people that provide support for any of these systems. For example, the management component 102 may identify end-to-end relationships between communication network hardware and one or more servers, applications residing on the servers, services provided by the applications, and the people that provide support for any of these systems. The assets may include, but are not limited to, applications whether commercial-off-the-shelf-software packages, business or other custom applications, any type of services or products provided or supported by the enterprise, human resources including employees and/or contractors, operating systems, server computers, general-purpose computer systems, desktop computers, laptop computers, mobile computing devices, main frame computers, modems, hubs, routers, wireless access points, gateways, switches, firewalls, circuit boards, printers, database management systems, disk drives, tape drives, facsimile machines, scanners, point-of-sale devices, and/or other assets.

Each of the components 104, 106, 108, 110, and 112, represent systems, resources, or processes to mine, identify and/or inventory the enterprise assets. In addition to these components 104, 106, 108, 110, and 112 the management component 102 may include primary, supplemental, or additional systems to identify and inventory assets. The management component 102 and/or its sub-systems may be used in conjunction with the components 104, 106, 108, 110, and 112 to augment or supplement the identification and compilation of asset information. The management component 102 is further operable to cross-reference information obtained from its systems, as well as information produced by these components 104, 106, 108, 110, and 112 to produce a more accurate listing of assets. The management component 102 then maps the relationships of these assets to one another to promote end-to-end enterprise asset management.

The management component 102, after identifying the assets in the manners discussed above, is operable to create any number of maps or relationships amongst and between the assets. For example, after identifying the servers, network components, and applications of the enterprise, the management component 102 may create a map to illustrate the relationships of all applications operating on each of the enterprise servers. The management component 102 is operable to maintain the map of these relationships, such as in a relational database, and provide reports including these relationships which may be presented such as by graphical or pictorial illustrations or otherwise.

In this manner, systems administrators can make informed decisions about applications that will be impacted by upgrading or moving, for example, one or more servers. In a large enterprise, a particular service may be supported by tens or even hundreds of applications residing on numerous servers. By identifying the relationships that exist between the applications and services that they support, when work is being performed on a particular server, the management component 102 can provide a listing of the impacted or related services, via the applications residing on the server. By further mapping the individuals, such as employees and so on, the appropriate individuals may be engage or notified based on the applications, servers, or services they support or are otherwise related.

The server component 104 operates to identify the servers in the enterprise. The server component 104 communicates with the management component 102 to provide a list of the servers in the enterprise. In one embodiment, the server component 104 may include a commercial off-the-shelf (COTS) tool such as IBM Tivoli that identifies and maintains an inventory of enterprise servers. Information about enterprise servers may be obtained from other sources as well. For example, the server component 104 may actively scan the enterprise for servers, or a local component, such as a computer program, may be provided on each server to obtain and report on server details.

Server information may be obtained from other sources including manually entered lists identifying enterprise servers, such as spreadsheets and other tracking and identification methods. When information is manually entered, problems arise with regard to integrity of the data entry. For example, server serial numbers or other server data may be incorrectly typed or entered which may cause problems. In one embodiment, the server component 104 obtains information about the enterprise servers in the various ways and from the various sources, such as, but not limited to, those listed above and provides and/or makes this information available to the management component 102.

The network component 106 operates to identify communication hardware of the enterprise. The communication hardware may include assets such as routers, hubs, wireless access points and/or other assets. In an embodiment, the network component 106 may include a product, such as Cisco Works by Cisco, operable for scanning the enterprise for communication hardware. The network component 106 reports the presence of the communication hardware assets to the management component 102. The network component 106 may continuously update the management component 102 of the presence of the assets or may provide periodic reports. In some embodiments, the network component may employ multiple products or systems to identify network resources. For example, in addition to Cisco Works, other systems or products, such as Visonael by Visionael Corp., may be employed for detecting the communication hardware assets and reporting to the management component 102. In addition to routers, hubs, and telecommunication infrastructure components, the information collected from these systems or products about the network communication hardware assets may include, for examples, routing tables that enable determinations of relationships, dependencies, and/or information flow among assets. The information collected by the network component 106 is communicated or made available to the management component 102.

The application component 108 operates to identify applications of the enterprise, including both third party COTS applications and custom business applications. In an embodiment, the application component 108 includes or interfaces with an Enterprise Development Process tool or EDP tool that maintains information about the enterprise's custom business applications. Additional information about EDP is provided in the patent applications "Defining and Sizing Feasible Approaches to Business Needs within an Integrated Development Process"and "Method For Discovering Functional and System Requirements In An Integrated Development Process," which are incorporated by reference above.

The application component 108 may also identify applications using tools such as HP Service Desk by Hewlett Packard, or other COTS tools. As applications are added to or removed from the enterprise, the system users update HP Service Desk appropriately. However, these users may fail to update HP Service Desk with changes to the status of applications in a timely manner, or may completely fail to update the system, such as when they forget. Also, individuals may fail to type in the correct application information. Thus, there are drawbacks to many of the individual identification systems.

Other means or systems for obtaining information on enterprise applications includes fingerprinting, which is a technique where a computer program scans a system for the application's main executable file. If the executable file is identified, the fingerprinting system reports that the application exists on the scanned system.

According to one embodiment, the present disclosure provides an expanded fingerprinting component operable for analyzing additional aspects related to applications. These additional aspects may include analyzing directory trees, residual files, and providing a file containing application details. The file containing application details is part of the fingerprinting component and is stored locally with each installation of the application(s). The fingerprinting component is operable to analyze the directory trees and/or file structures of scanned applications to obtain additional information about the applications. For example, a back-up copy of an application located on a computer does not necessarily represent a copy of the application that should be counted for inventorying, licensing, and so on. An installed application might have a significantly different directory tree than a back-up or other copies of the same application. Therefore, analyzing the directory tree is one method of identifying applications as the status of the application on enterprise systems.

Another method for identifying applications is to search for residual files, such as files other than the main executable file used to run the application. These files may be data, executable, preference, graphics, sound or other media files, support or files other than the main executable of the application. Version information may be maintained in certain of these files, or information about an application may also be determined based on the name of a particular file related to the application. Other information about these files may be analyzed including the file size.

Applications may also generate temporary or other files, such as for file swapping, during operations. Often the applications do not clean-up after themselves completely and these files remain on the system even when the application is no longer being used. By scanning for these files, it may be possible to determine whether the application has actually been in use on the particular computer, and by analyzing the dates of these files, it may be possible to determine when the last time the application was used. Other file information or analysis may be conducted, which will suggest themselves to one skilled in the art. Furthermore, by combining directory tree and various types of residual file analysis, more applications and their actual status may be identified. The disclosed techniques may be otherwise combined or combined with other known techniques which will readily suggest themselves to one skilled in the art based on the teachings of this disclosure.

Another means of identifying applications is to distribute a version file with the application when the application is deployed. The application component 108 then searches for and reads the version file which contains all the relevant information about the application, such as name, version, dates, and any other relevant application information.

In one embodiment, any of the various systems may be run daily to obtain an up-to-date picture of enterprise assets. For example, components on the servers may periodically report about the status of the server upon which they operate. Servers recently removed from service would not be reported on and, perhaps after cross-checks, the inventory of servers would be updated noting that the server was eliminated or no longer in service. Likewise, applications that were recently added would be identified by, for example, a nightly check by the fingerprinting component. These newly added applications would be added to the applications inventory.

The resources component 110 operates to identify human resources of the enterprise. Human resources may be associated with a plurality of assets. For example, a mobile device may include an associated human resource with an identification, such as an IP address, a phone number, a MAC address, and/or email address. The resources component 110 identifies people and the management component 102 may then cross-reference these human resources with other enterprise assets. The resources component 110 may provide data, such as addresses, social security numbers, and/or other information to the management component 102, or perhaps the resources component 110 may only provide the location information, such as a pointer, to allow the management component 102 to access the data. The resources component 110 may include or obtain information from other systems, such as the enterprise's human resource system, or the EDP tool. Other systems and techniques for identifying and maintaining accurate and up-to-date information on human resources may be found in the patent application entitled "Application Management Database with Personnel Assignment and Automated Configuration Application" which is incorporated by reference above.

Various examples for identifying human resources may be employed by the resources component 110. For example, a trend analysis of login sessions may be conducted to associate a specific user with a desktop, for example, based on the user logging into the desktop three times in a row. The employment of login trend analysis may prevent a one-time user from being incorrectly associated with a system. In an embodiment, trend analysis of logins may be used on other assets, also, to associate an individual with the assets. In an embodiment, trend analysis of logins may be performed by an agent or a software component that executes on the subject asset, for example a desktop computer or a laptop computer, and communicates back to the asset management repository automated tool.

The services component 112 identifies services of the enterprise. Services may include any product, service, or other offering supported by the business enterprise. The services component 112 may include or access one or more tools identifying all the services of the enterprise. Some of these tools may rely on manual entry to provide a listing of enterprise services. The EDP tool may include organizational and procedural components for managing projects, such as a software application project, and include details regarding some of the enterprise products and/or services.

Figure 1B:
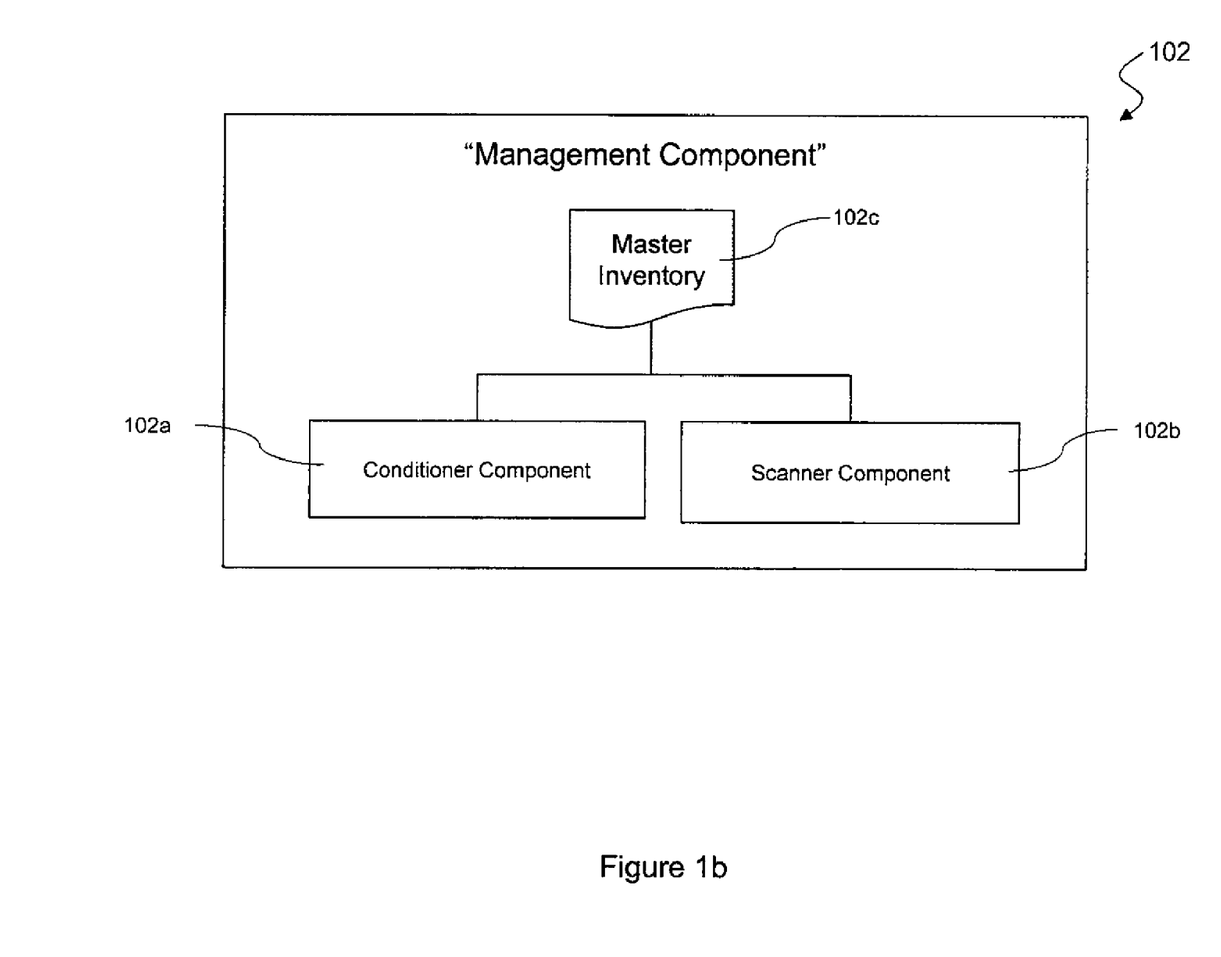
FIG. 1b is a block diagram of a management system according to one embodiment of the present disclosure.

Turning now to FIG. 1b, a block diagram depicts one embodiment of the management component 102. The management component 102 includes a conditioner component 102a, and a scanner component 102b. In an embodiment, the conditioner component 102a communicates with one or more of the component(s) 104, 106, 108, 110, and 112 to establish an inventory of the enterprise assets. The conditioner component 102a provides asset inventory information to form a master inventory list 102c. In some embodiments, the master inventory list 102c may be numerous files, databases, data stores, or systems whereby access to complete enterprise inventory information may be obtained, accessed, or aggregated.

The scanner component 102b may include supplemental scanning components or capabilities, such as the enhanced fingerprinting component. Systems of the scanner component 102b may be used as primary sources or in addition to the component(s) 104, 106, 108, 110, and 112 to establish the inventory of the enterprise assets. The conditioner component 102a is operable to use information obtained on the enterprise assets from the components 104, 106, 108, 110, and 112 in combination with the additional information obtained from the scanner component 102b to obtain information on the enterprise assets that may be more comprehensive and accurate. Further the management component 102 may leverage this information to further improve the information on enterprise assets and their relationships. For example, identification of a service, such as new service for a wireless telephone, may be related, such as in the EDP tool, to hundreds of applications which can be associated with the particular service. The applications identified by the application component 108 can be cross-referenced to the listing of applications associated with the services to augment and improve the inventory of applications.

As another example, the applications information includes information about the servers upon which the applications operate, and vice versa. The server inventory can be verified and refined by cross-referencing it with the server related information obtained as part of the applications information. Cross-referencing this same information may also be beneficial to ensure that all server-application relationships appear accurate. There are numerous other examples of ways that this information may be cross-referenced to verify, update, and augment the enterprise assets data and other examples will readily suggest themselves to one of ordinary skill in the art.

For example, where nightly scanning is conducted, it might be found that certain applications are accounted for, but certain servers, such as Server A, no longer exist. Information about the applications that are known to be on Server A might be consulted. Where the applications were identified by the nightly scan, it might be assumed that the scan of Server A failed for some reason, but that Server A is still operational and other inquiries might be made before considering Server A off-line or out of service. Conversely, if no information on the applications known to have been on Server A was identified during the nightly scan, this might support that Server A is out of service, since the server scan had similar results.

As another example, a particular directory tree configuration identified with regard to an application might be indicative of a particular operating system, such as Unix, on a particular server. However, the server information might suggest another operating system is present on the particular server. In such a circumstance, it may be impossible for the management component 102 to resolve this conflicting data and additional research or information may be needed. In the event of conflicting information, such as in the prior example, one solution is to provide degrees of confidence related to the enterprise asset data. For example, higher degrees of confidence might be assigned to assets where all the data is in agreement, while lower degrees of confidence might be assigned where conflicting data exists.

The management component 102 is therefore able to maintain accurate maps of the relationship between all the enterprise assets. Such relationships may be included in the master inventory list 102c to provide greater relational detail. This information may be used, for example, by a systems administrator that needs to upgrade a server. The relationship data may be used to identify the appropriate manager responsible for applications on the server to be upgraded, as well as notifying parties that will be impacted by any accompanying service disruptions. The management component 102 is operable to maintain complete information on enterprise assets and their relationships, from end-to-end.

Figure 1C:
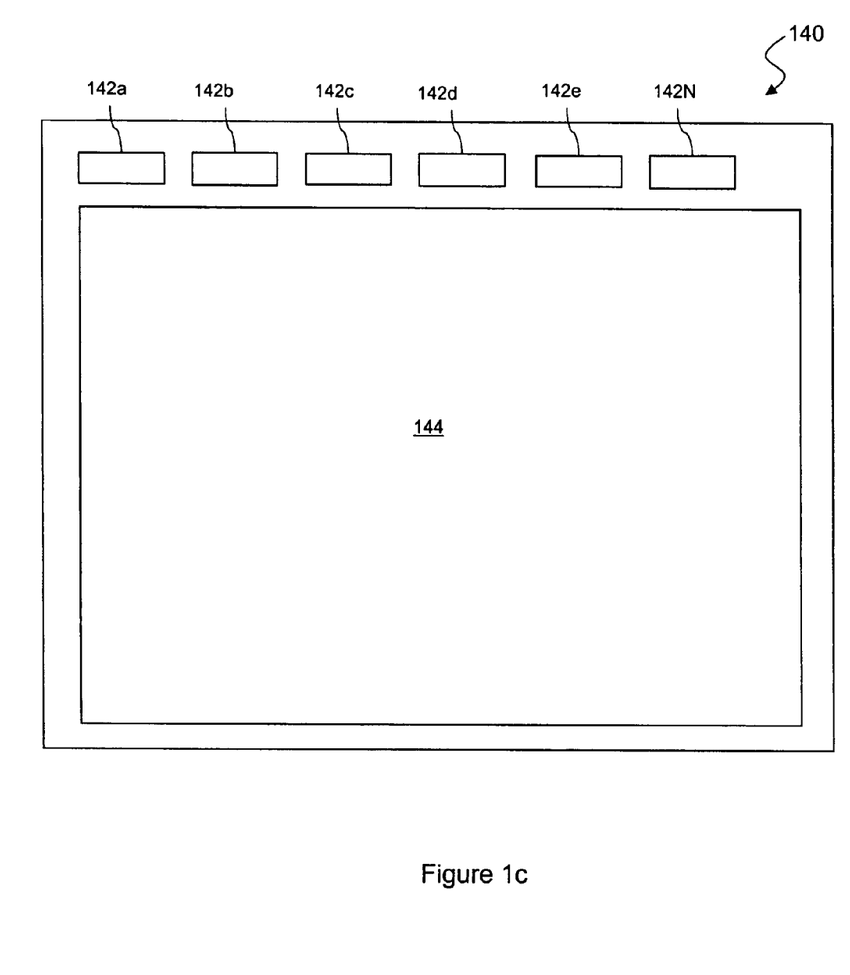
FIG. 1c illustrates one embodiment of a graphical user interface adapted for providing end-to-end configuration management according to another aspect of the present disclosure.

The management component 102 described above may be operated with a graphical user interface (GUI) 140 as illustrated in FIG. 1c. The GUI 140 may operate on a general-purpose computer, which is discussed in greater detail below, and/or other enterprise assets. The GUI 140 may be operated through a web browser, and/or other customized user interfaces. The GUI 140 may also be adapted for viewing and/or editing one or more end-to-end configurations collected and/or modified by the management system 102. The GUI 140 includes buttons 142a, 142b, 142c, 142d, 142e, . . . 142N, and holistic interface view 144.

The buttons 142a, 142b, 142c, 142d, 142e, . . . 142N may be adapted for observing specific end-to-end enterprise, asset relations, cut and paste of information, saving information, scheduling installation and/or removal of applications, and/or other functions. The buttons 142a, 142b, 142c, 142d, 142e, . . . 142N may include a touch-pad and/or may be located within a display (e.g., liquid crystal display), in one embodiment.

The holistic interface view 144 includes information provided by the end-to-end configuration management system 100. For example, the holistic interface view 144 may include a log depicting end-to-end relations between services, applications, servers, and/or people. Of course, the holistic interface view 144 may also include other information that may be associated with the activity of the management system 102, and/or other enterprise assets. It is also understood, that the holistic interface view 144 provides real-time global enterprise end-to-end configuration management, which may employ COTS tools and/or other customized tools that operate in conjunction with the GUI 140.

Figure 2:
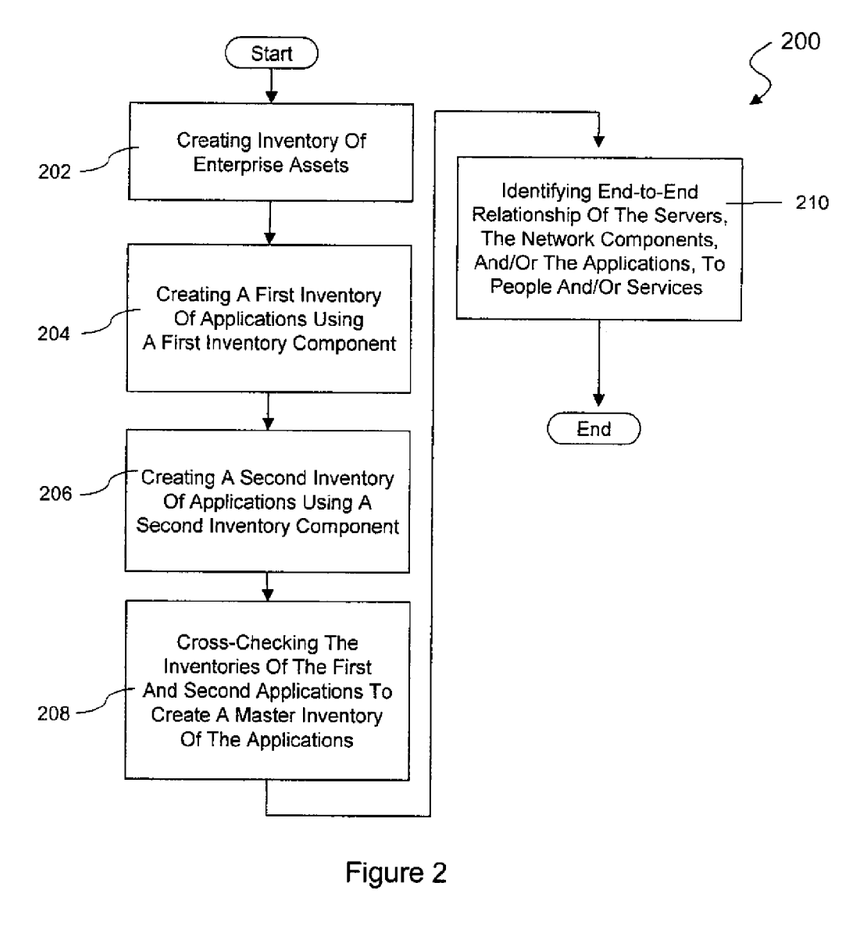
FIG. 2 is a flow chart of a method for providing end-to-end configuration management according to one embodiment of the present disclosure.

Turning now to FIG. 2, a flow chart illustrates a method 200 for providing end-to-end configuration management. In block 202, the management component 102 invokes or refers to the first inventory component, such as one or more of the components 104, 106, 108, 110, and 112, creates an inventory of one or more of the servers, applications and network components and so on. The inventory may be stored in the master inventory list 102c or may be stored on other assets of the enterprise.

The method proceeds to block 204, where the first inventory component creates a first inventory of the applications. The first inventory component may include COTS tools such as HP Service Desk and/or other customized tools adapted for generating lists of enterprise assets.

The method proceeds to block 206 where the second inventory component, such as the scanner 102b, creates a second inventory of, for example, the enterprise applications. The inventory may include scanning for specific executable files, preference files, directory trees, version files, and/or other information.

At block 208, the first and the second inventory of the applications are cross-checked by the conditioner component 102a and aggregated to create the master inventory 102c. In this block, the cross-checking may be with other inventories, such as servers, services, human resources, and so on.

At block 210, end-to-end relationships are established between the servers, the network components, the applications, the services, and/or human resources. The master inventory list 102c thereby provides a global relationship between the assets of the enterprise. The method then ends.

Figure 3:
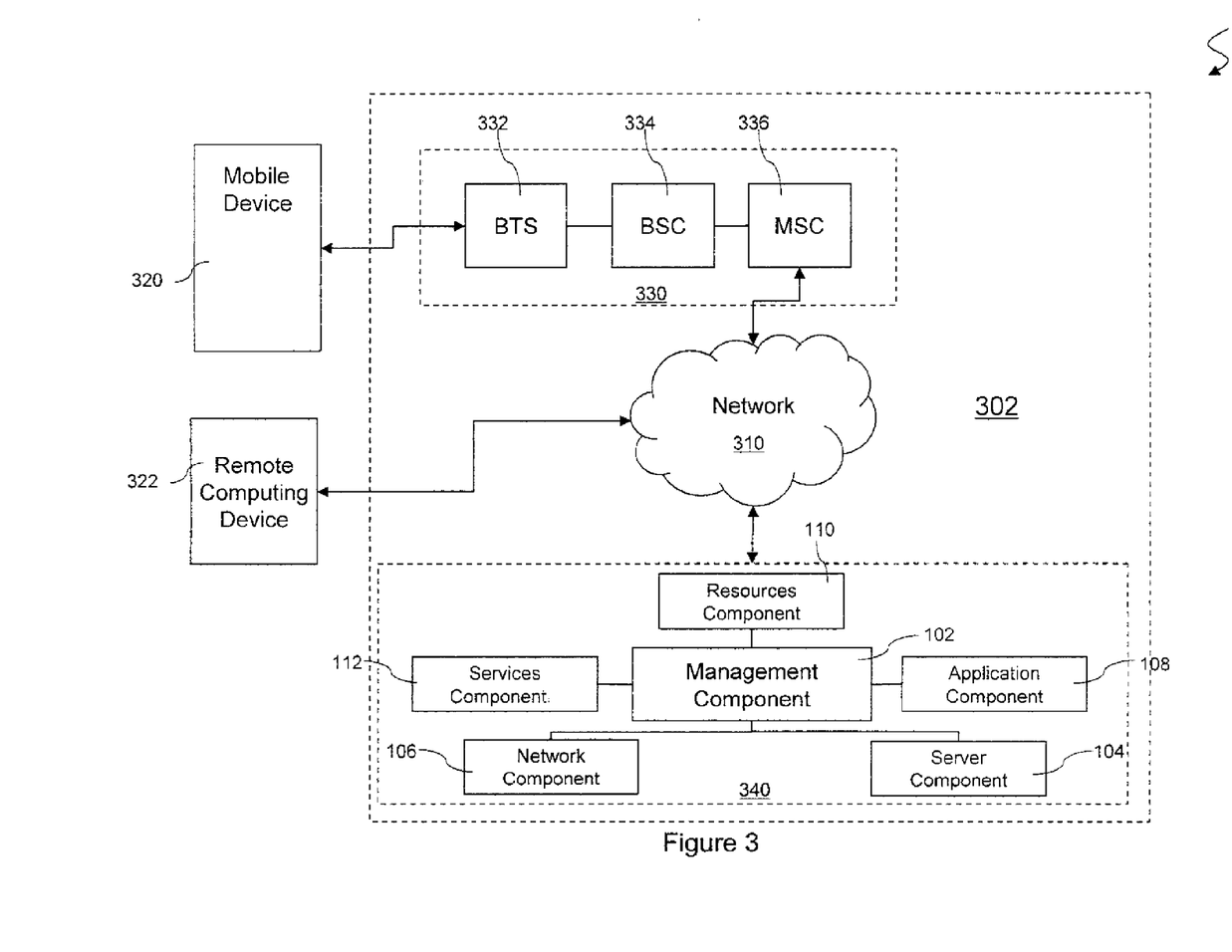
FIG. 3 illustrates an exemplary system suitable for implementing the several embodiments of the present disclosure.

Turning now to FIG. 3, a system 300 is depicted that illustrates the environment in which the management component 102 operates and examples of the enterprise resources which may be identified and monitored. The system 300 includes an information technology (IT) infrastructure 302, a mobile device 320, and a remote computing device 322. The mobile device 320 and the remote computing device 322 are in communication with the IT infrastructure 302 through a network 310. The mobile device 320 and the remote computing device 322 receive calls from the end-to-end configuration management system 340 through the IT infrastructure 302.

The IT infrastructure 302 communicates with a wireless network 330, the network 310, and the end-to-end configuration management system 340. In one embodiment, the end-to-end configuration management system 340 may be substantially similar to the system 100 of FIG. 1a.

The network 310 provides the communications link between the end-to-end configuration management system 340, the mobile device 320, and the remote computing device 322. The network 310 may be the Internet, an intranet, extranet, an enterprise network, or combinations thereof. It is contemplated that the system 300 may be employed to implement the management enterprise assets of the end-to-end configuration management system 340. In an embodiment, the network 310 may include the Internet, a public switched telephone network (PSTN), and/or other networked systems.

The wireless network 330 may comprise a transceiver in wireless radio communication with the mobile device 320, a bridge node linking to the network 310, such that the transceiver is in communication with the bridge node, in an embodiment.

In one embodiment, a base transceiver station (BTS) 332 is in radio communication with the mobile device 320, a mobile switching center (MSC) 336 bridges the wireless network 330 to the network 310, and a base station controller (BSC) 334 links the BTS 332 with the MSC 336.

In another embodiment, the BTS 332 is in radio communication with the mobile device 320, a gateway global packet radio system support node (GGSN) bridges the wireless network 330, a base station controller (BSC) 334 links the BTS 332 to a serving global packet radio system support node (SGSN), and the SGSN is in communication with the GGSN. Other wireless network topologies are also possible. The construction of information technology systems is well understood by those skilled in the art. The system 300 employs the IT infrastructure 302 merely as a link between the mobile device 320, the remote computing device 322, and the end-to-end configuration management system 340.

Figure 4:
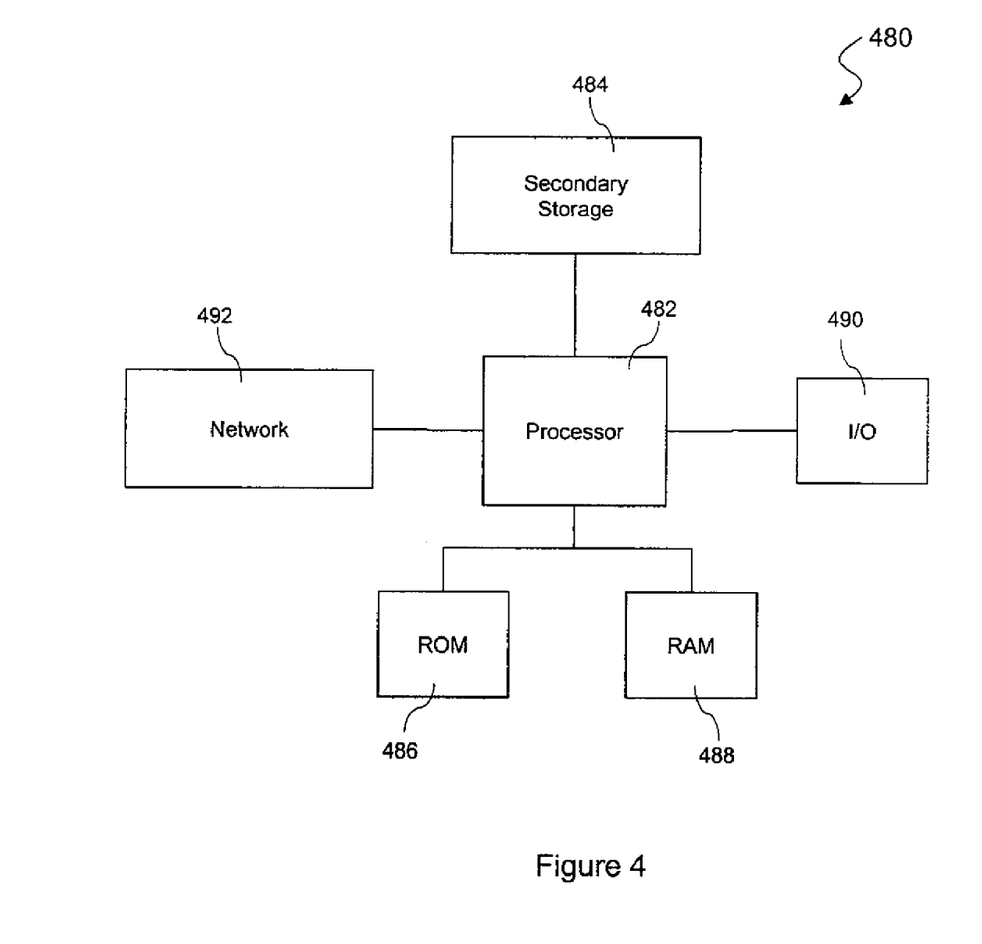
FIG. 4 illustrates an exemplary general-purpose computer system suitable for implementing the several embodiments of the present disclosure.

The system 100, GUI 140, and IT system 300 described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, and scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of end-to-end configuration management, comprising:
    creating an inventory of servers of an enterprise;
    creating an inventory of network components of the enterprise, wherein the inventory of network components includes at least some information related to relationships, dependencies, and/or information flowing among assets of the enterprise;
    creating a first inventory of applications of the enterprise using a first inventory component executing on a processor including a tool configured to generate a list of applications deployed in the enterprise;
    creating a second inventory of the applications of the enterprise using a second inventory component executing on a processor to automatically scan systems of the enterprise for at least one selected from the group consisting of: executable files, residual files, directory trees, version files, and status reports, wherein the second inventory component is different from the first inventory component;
    cross-checking the first and second inventories of the applications of the enterprise to create a master inventory of applications of the enterprise, the master inventory of the applications including at least some information related to at least some of the servers whereon the applications reside;
    assigning a degree of confidence to each asset of the master inventory of applications based on the cross-checking, wherein the degree of confidence assigned to assets where data of the first inventory and the second inventory are in agreement is higher than the degree of confidence assigned to assets where data of the first inventory and the second inventory are in conflict;
    cross-checking the inventory of servers and the at least some information related to the at least some of the servers whereon the applications reside from the master inventory of applications to create a master inventory of servers of the enterprise;
    creating an inventory of people of the enterprise and cross-referencing the people with other assets of the enterprise;
    creating an inventory of services provided by the enterprise, wherein each of the services provided by the enterprise is supported by at least one of the applications of the enterprise;
    identifying end-to-end relationships from at least some of the servers, to at least some of the network components, to at least some of the applications, to at least some of the people, and to at least some of the services provided by the enterprise using the master inventory of servers, the inventory of network components, the master inventory of applications, the inventory of people, and the inventory of services; and
    creating a map of the identified end-to-end relationships to graphically illustrate the identified relationships.

2. The method of claim 1, further comprising cross-checking with the people of the enterprise to improve the inventory of the servers of the enterprise.

3. The method of claim 1, wherein the first inventory component for creating the first inventory of applications of the enterprise is further defined as HP Service Desk, and wherein the second inventory component for creating the second inventory of applications of the enterprise is further defined as fingerprinting component.

4. The method of claim 3, wherein the fingerprinting component identifies applications by a file structure associated with the application.

5. The method of claim 4, wherein the file structure associated with the application for fingerprinting is further defined as identifying files used by the application to identify the application is in use on a computer or a version of the application.

6. The method of claim 3, wherein the fingerprinting component identifies applications by a directory structure associated with the application.

7. The method of claim 3, wherein the fingerprinting component identifies applications by an application versions identifier associated with the application.

8. The method of claim 7, wherein application versions identifier associated with the application is further defined as a file distributed with the application including the application information including a version of the application.

9. A system for end-to-end configuration management, comprising:
  a server component that identifies servers in an enterprise;
  a network component that identifies communication network hardware of the enterprise;
  a first application component executable on a processor that identifies a first set of applications of the enterprise, wherein the first application component automatically scans-systems of the enterprise to identify at least one selected from the group consisting of: executable files, residual files, directory trees, version files, and status reports;
  a second application component executable on a processor that identifies a second set of applications of the enterprise, wherein the second application component is different from the first application component and generates a list of applications deployed in the systems of the enterprise;
  a resources component that identifies human resources of the enterprise;
  a services component that identifies services provided by the enterprise, wherein each of the services provided by the enterprise is supported by least one of the applications of the enterprise; and
  a management component that cross-checks the first set of applications and the second set of applications to create a master set of applications, and assigns a degree of confidence to the master set of applications, wherein the degree of confidence assigned to assets where data of the first set of applications and the second set of applications are in agreement is higher than the degree of confidence assigned to assets where data of the first set of applications and the second set of applications are in conflict;
  the management component further identifies relationships between at least some of the communication network hardware to at least some of the servers, and from at least some of the servers to at least some of the applications, and from at least some of the applications to at least some of the human resources, and from at least some of the applications to at least some of the services using the inventory of servers, the inventory of network components, the master set of applications, the inventory of people, and the inventory of services, and the management component creates a map of the identified relationships to graphically illustrate the identified relationship.

10. The system of claim 9, wherein the resources component to identify the human resources of the enterprise is further defined as a human resource database.

11. The system of claim 9, wherein the second application component that identifies applications of the enterprise is further defined as an enterprise development process tool.

12. The system of claim 9, wherein the second application component that identifies applications is further defined as HP Service Desk and wherein the applications are further defined as third party applications and custom business applications.

13. The system of claim 9, wherein the communication network hardware is further defined as connectivity hardware including routers and hubs.

14. The system of claim 9, wherein the network component is further defined as one of a Cisco Works tool and Visionael tool asset management repository.

15. A computer implemented method for end-to-end configuration management, comprising:
  identifying servers in an enterprise;
  identifying communication network hardware of the enterprise;
  identifying a first set of applications of the enterprise with a first inventory component executing on a processor by automatically scanning systems of the enterprise to identify at least one selected from the group consisting of: executable files, residual files, directory trees, version files, and status reports;
  identifying a second set of applications of the enterprise with a second inventory component executing on a processor by generating a list of applications deployed in the enterprise, wherein the second inventory component is different from the first inventory component;
  identifying human resources of the enterprise;
  identifying services provided by the enterprise, wherein each of the services provided by the enterprise is supported by least one of the applications of the enterprise;
  cross-checking the first and the second set of the applications to create a master set of applications;
  assigning a degree of confidence to the master set of applications based on the cross-checking, wherein the degree of confidence assigned to assets where data of the first set of applications and the second set of applications are in agreement is higher than the degree of confidence assigned to assets where data of the first set of applications and the second set of applications are in conflict;
  determining relationships between at least some of the communication network hardware to at least some of the servers, and from at least some of the servers to at least some of the applications, and from at least some of the applications to at least some of the human resources, and from at least some of the applications to at least some of the services using the inventory of servers, the inventory of network components, the master inventory of applications, the inventory of people, and the inventory of services;
  creating a map of the relationships to graphically illustrate the relationships; and
  storing the map of the relationships on a computer readable storage medium.

16. The method of claim 15, wherein the identifying human resources of the enterprise is preformed through a search of a human resource database.

17. The system of claim 15, wherein the applications of the enterprise are software applications.

18. The system of claim 15, wherein the communication network hardware of the enterprise comprises connectivity hardware including routers and hubs.

19. The system of claim 15, wherein the servers execute a Cisco Works tool.

20. The method of claim 1, wherein cross-referencing the people with other assets of the enterprise comprises performing trend analysis of logins.

* * * * *